US012697965B2

(12) United States Patent
Shinagawa

(10) Patent No.: US 12,697,965 B2
(45) Date of Patent: Aug. 4, 2026

(54) ASSISTANCE APPARATUS, VEHICLE, COMPUTER READABLE STORAGE MEDIUM, AND ASSISTANCE METHOD

(71) Applicant: HONDA MOTOR CO., LTD., Tokyo (JP)

(72) Inventor: Masaharu Shinagawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 18/797,538

(22) Filed: Aug. 8, 2024

(65) Prior Publication Data

US 2025/0050876 A1     Feb. 13, 2025

(30) Foreign Application Priority Data

Aug. 10, 2023     (JP) ................................. 2023-130925

(51) Int. Cl.
B60W 30/09 (2012.01)
B60W 30/095 (2012.01)

(52) U.S. Cl.
CPC ........ B60W 30/09 (2013.01); B60W 30/0953 (2013.01); B60W 30/0956 (2013.01); B60W 2554/4041 (2020.02); B60W 2554/4042 (2020.02); B60W 2554/802 (2020.02)

(58) Field of Classification Search
CPC .... B60W 30/10; B60W 30/16; B60W 30/162; B60W 30/165
See application file for complete search history.

(56) References Cited

U.S. PATENT DOCUMENTS

| | | | | |
|---|---|---|---|---|
| 2012/0290173 A1* | 11/2012 | Irie | ....................... | B60W 30/16 701/41 |
| 2015/0063648 A1 | 3/2015 | Minemura | | |
| 2017/0327117 A1* | 11/2017 | Ochi | ......................... | B60T 7/12 |
| 2020/0079368 A1* | 3/2020 | Yamada | ................ | G08G 1/166 |

FOREIGN PATENT DOCUMENTS

| | | |
|---|---|---|
| JP | H07168994 A | 7/1995 |
| JP | 2011253241 A | 12/2011 |
| JP | 2015045622 A | 3/2015 |

OTHER PUBLICATIONS

Office Action issued for counterpart Japanese Application No. 2023-130925, transmitted from the Japanese Patent Office on May 20, 2025 (drafted on May 12, 2025).

* cited by examiner

*Primary Examiner* — Anshul Sood

(57)     ABSTRACT

An assistance apparatus comprises a receiving unit which receives information indicating a position of a preceding vehicle which is traveling ahead of a vehicle in a running direction, a setting unit which sets a reference point to provide traveling assistance for the vehicle based on the position of the preceding vehicle when the preceding vehicle is determined to be hazardous for the vehicle to travel, and an assistance controlling unit which provides the traveling assistance based on the reference point, wherein the setting unit updates the reference point while predetermined conditions for determining that the preceding vehicle is hazardous are satisfied after the preceding vehicle is determined to be hazardous.

20 Claims, 9 Drawing Sheets

ASSISTANCE APPARATUS, VEHICLE, COMPUTER READABLE STORAGE MEDIUM, AND ASSISTANCE METHOD

The contents of the following patent application(s) are incorporated herein by reference:

NO. 2023-130925 filed in JP on Aug. 10, 2023.

BACKGROUND

1. Technical Field

The present invention relates to an assistance apparatus, a vehicle, a computer readable storage medium, and an assistance method.

2. Related Art

In recent years, efforts have been intensified to provide access to a sustainable transportation system with consideration given to even vulnerable people among other traffic participants. To realize this, research and development has been focused on to even further improve traffic safety and convenience through research and development regarding a driving assistance technology. Patent Documents 1 and 2 describe a technology related to a range for detecting an object or another vehicle.

PRIOR ART DOCUMENT

Patent Document

Patent Document 1: Japanese Patent Application Publication No. 2015-45622

Patent Document 2: Japanese Patent Application Publication No. 2011-253241

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solving means of the invention.

Figure 1:
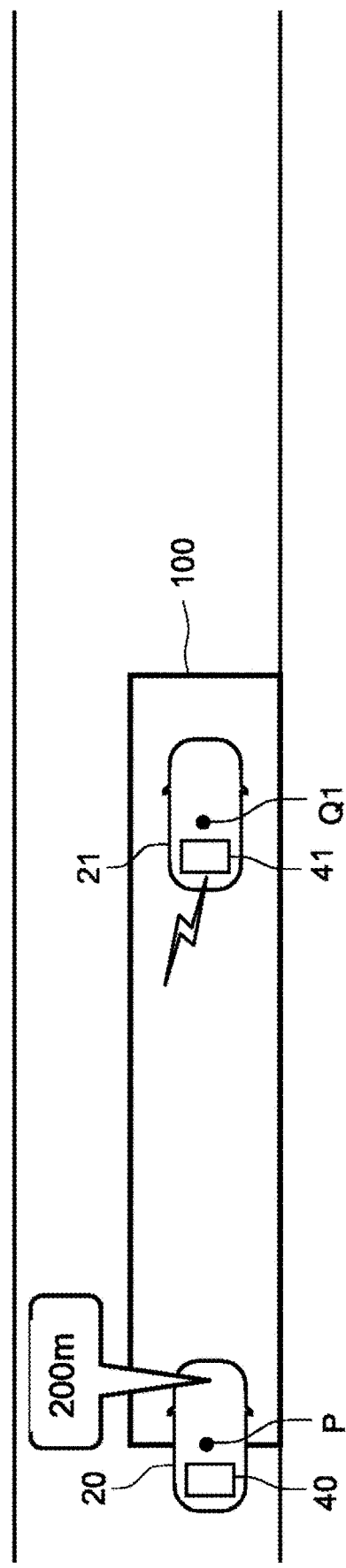
FIG. 1 schematically shows a usage scene of an assistance apparatus 40 according to one embodiment.

FIG. 1 schematically shows a usage scene of an assistance apparatus 40 according to one embodiment. A vehicle 20 includes an assistance apparatus 40. A preceding vehicle 21 includes an assistance apparatus 41. The assistance apparatus 40 and the assistance apparatus 41 have traveling assistance functions of performing control regarding traveling assistance for their respective vehicles.

The preceding vehicle 21 is a preceding vehicle which travels ahead of the vehicle 20 on a running route. The assistance apparatus 40 and the assistance apparatus 41 periodically transmit traveling information including identification information, current position, current acceleration/deceleration, and current speed of their respective vehicles to an outside. The present embodiment describes a configuration in which the assistance apparatus 40 performs the control regarding the traveling assistance for the vehicle 20 based on the traveling information transmitted from the assistance apparatus 41.

When the assistance apparatus 40 determines that the preceding vehicle 21 has rapidly decelerated based on the acceleration/deceleration included in the traveling information transmitted from the assistance apparatus 41, it determines whether a point Q1, which indicates a current position of the preceding vehicle 21 included in the traveling information, is present within a range of detection 100, which is a range for detecting a reference point for the traveling assistance in the vehicle 20. The range of detection 100 is a range which is located ahead of the vehicle 20 along a running direction of the vehicle 20 from a current position P of the vehicle 20. The range of detection 100 is, for example, a rectangular range. The assistance apparatus 40 may set a length of the range of detection 100 in a direction along a traveling direction of the vehicle 20 to be longer as speed of the vehicle 20 is faster.

The assistance apparatus 40 provides the traveling assistance when the point Q1 is within the range of detection 100. As shown in FIG. 1, since the point Q is present within the range of detection 100, the assistance apparatus 40 provides the traveling assistance. Specifically, the assistance apparatus 40 provides the traveling assistance using the point Q as the reference point. For example, the assistance apparatus 40 displays information indicating a distance from the current position P of the vehicle 20 to a point P, using a Human Machine Interface (HMI) function included in the assistance apparatus 40. FIG. 1 shows an example in which "200 m" is displayed as information indicating a distance from a current position P1 of the vehicle 20 to a reference point Q1.

Figure 2:
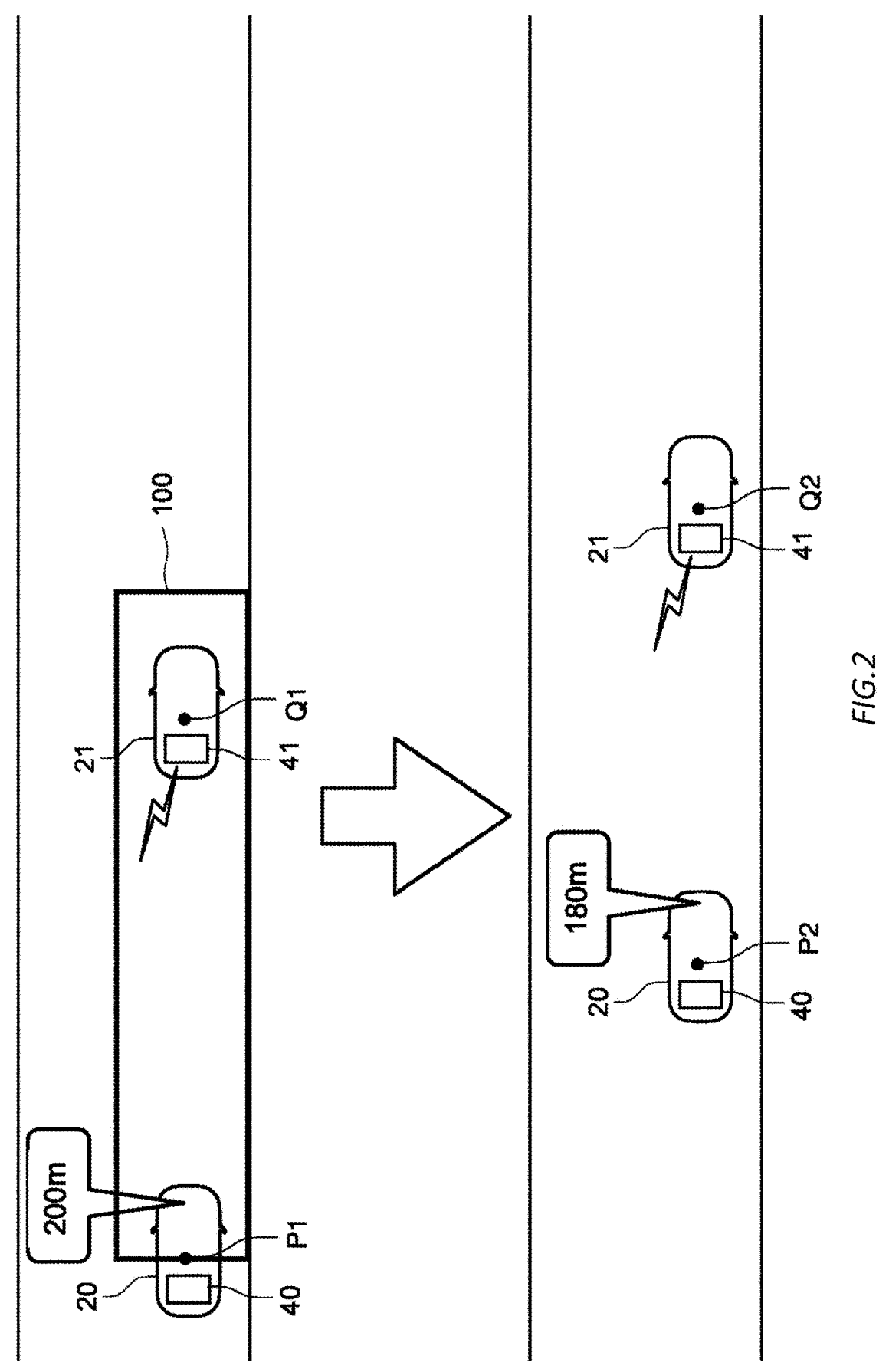
FIG. 2 shows a state in which a vehicle 20 approaches a preceding vehicle 21.

FIG. 2 shows a state in which the vehicle 20 approaches the preceding vehicle 21. The assistance apparatus 40 determines whether the preceding vehicle 21 is hazardous for the vehicle 20, based on the traveling information periodically transmitted from the assistance apparatus 41. For example, the assistance apparatus 40 determines that the preceding vehicle 21 is hazardous for the vehicle 20 when speed of the preceding vehicle 21 included in the traveling information is less than or equal to a predetermined speed value. While the assistance apparatus 40 determines that the preceding vehicle 21 is hazardous for the vehicle 20, it updates the reference point with a latest position of the preceding vehicle 21, and provides the traveling assistance based on the reference point.

The example in FIG. 2 shows a state in which the preceding vehicle 21 is determined to be hazardous for the vehicle 20, and a latest position Q2 of the preceding vehicle 21 is set as the reference point to provide the traveling assistance. Specifically, an example is shown in which "180 m" is displayed as information indicating a distance from a current position P2 of the vehicle 20 to a reference point Q2.

Figure 3:
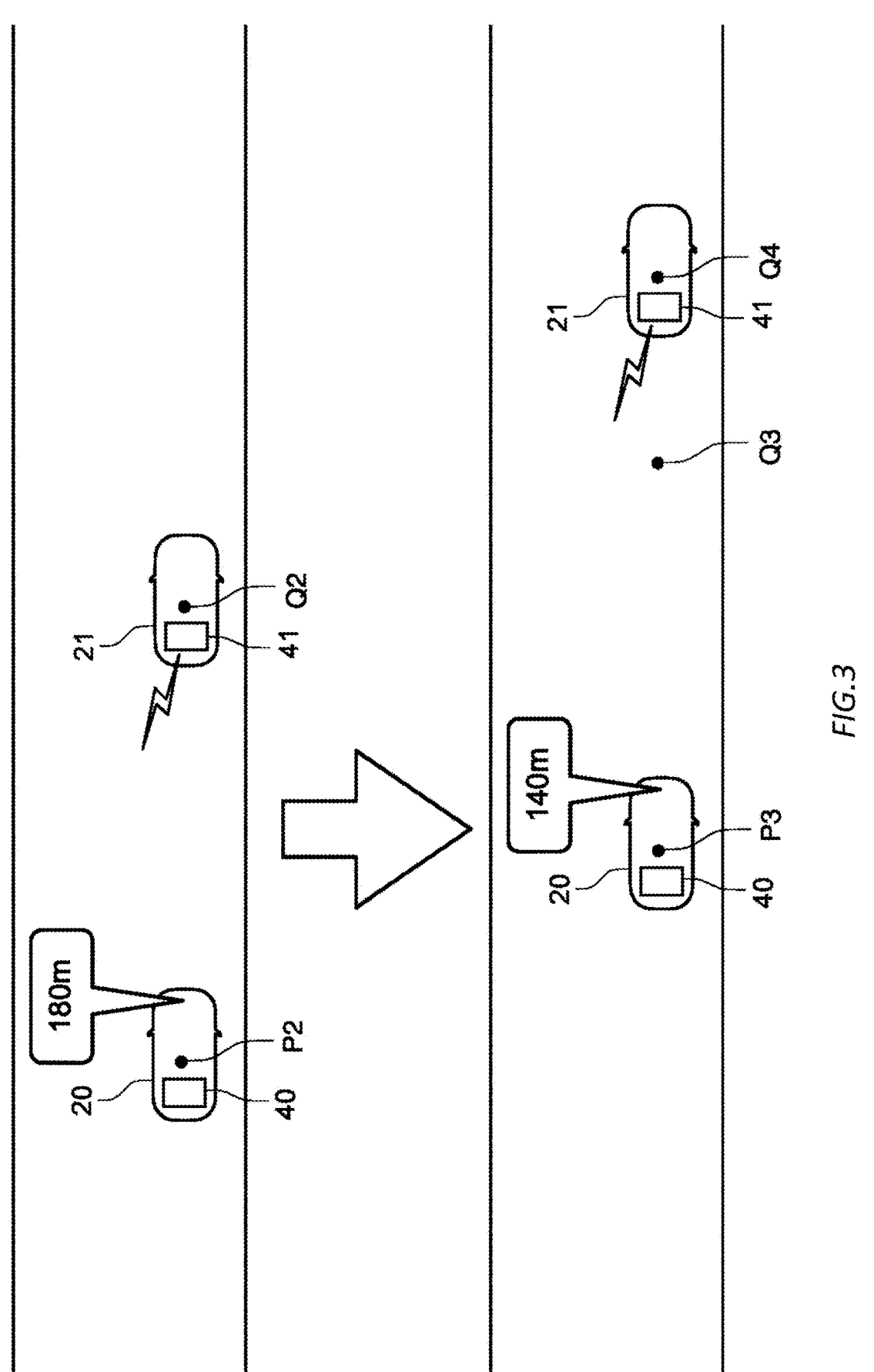
FIG. 3 shows a state in which speed of the preceding vehicle 21 exceeds a predetermined speed value.

FIG. 3 shows a state in which the speed of the preceding vehicle 21 exceeds the predetermined speed value. When the speed of the preceding vehicle 21 included in the traveling information transmitted from the assistance apparatus 41 exceeds the predetermined speed value, the assistance apparatus 40 fixes a point Q3, where the speed of the preceding vehicle 21 is determined to have exceeded the predetermined speed value, as the reference point, and provides the traveling assistance.

The example in FIG. 3 shows a state in which the point Q3 is set as the reference point to provide the traveling assistance. Specifically, an example is shown in which "140 m" is displayed as information indicating a distance from a current position P3 of the vehicle 20 to a reference point Q3. The assistance apparatus 40 provides the traveling assistance based on the reference point Q3 until the current position of the vehicle 20 reaches the reference point Q3. The assistance apparatus 40 stops providing the traveling assistance based on the reference point Q3 when the current position of the vehicle 20 passes the reference point Q3.

In this manner, the assistance apparatus 40 can provide the traveling assistance while updating the reference point according to a movement of the preceding vehicle 21 after the preceding vehicle 21 rapidly decelerated. Therefore, a distance from the vehicle 20 to the preceding vehicle 21 can be properly notified to an occupant of the vehicle 20 because the traveling assistance can be continuously provided without stopping even after the vehicle 20 reaches the point where the preceding vehicle 21 rapidly decelerated, if the preceding vehicle 21 continues to move after it rapidly decelerated. This can enhance usability of the vehicle 20, which in turn can enhance traffic safety.

Figure 4:
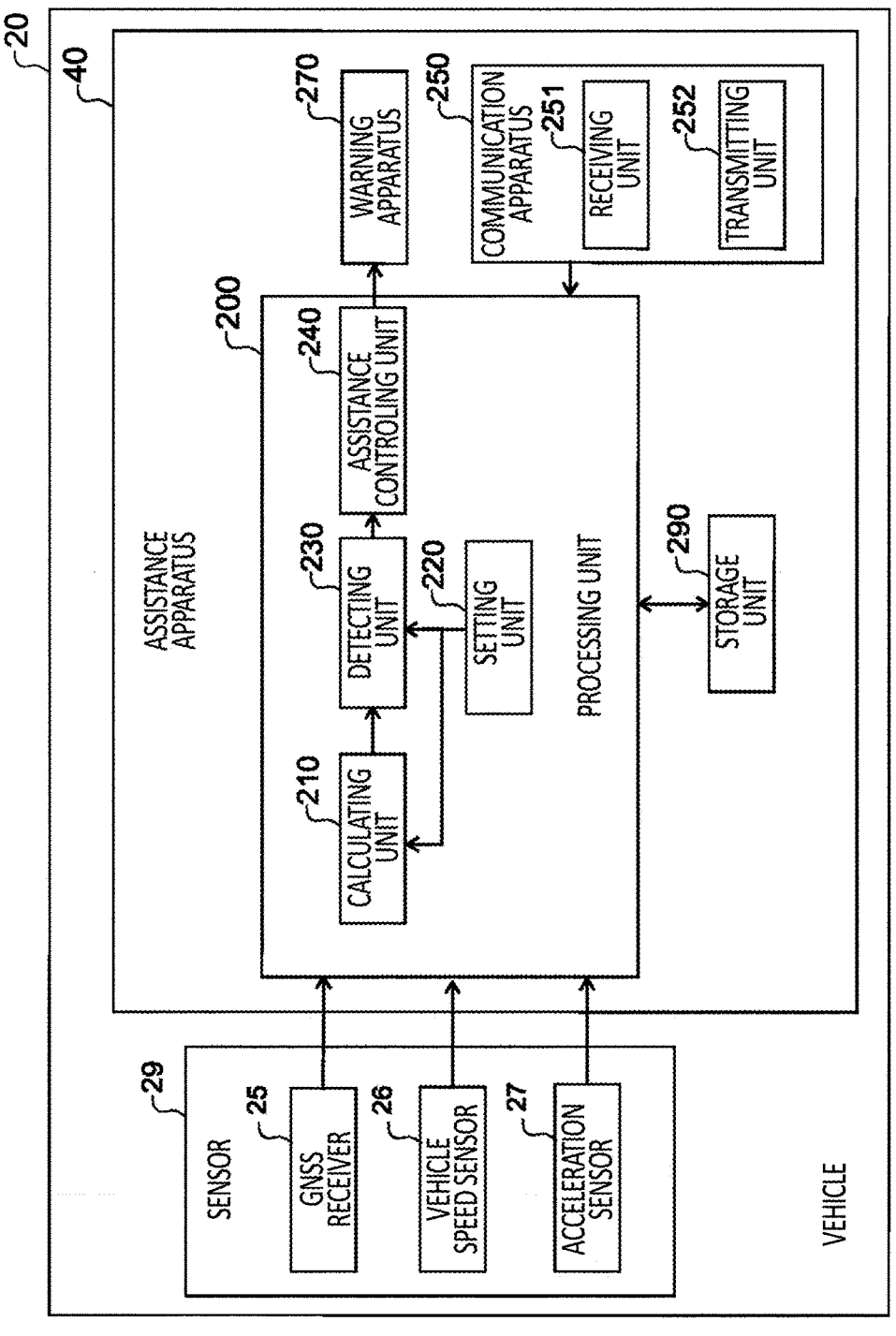
FIG. 4 shows a system configuration of the vehicle 20.

FIG. 4 illustrates a system configuration of the vehicle 20. The vehicle 20 includes a sensor 29, the assistance apparatus 40, a communication apparatus 250, and an warning apparatus 270.

The sensor 29 includes a GNSS receiver 25, a vehicle speed sensor 26, an acceleration sensor 27, and the like. The vehicle speed sensor 26 detects the speed of the vehicle 20. The acceleration sensor 27 detects acceleration of the vehicle 20. The GNSS receiver 25 obtains current position information of the vehicle 20 with a global navigation satellite system (GNSS). The warning apparatus 270 is equipment including, for example, the human machine interface (HMI) function. The communication apparatus 250 is responsible for communication with the outside of the vehicle 20. The communication apparatus 250 performs vehicle-to-vehicle communication by direct communication such as, for example, PC5. The communication apparatus 250 may perform communication with another vehicle by communicating through a base station of mobile communication. The communication apparatus 250 includes a receiving unit 251 and a transmitting unit 252.

The assistance apparatus 40 includes a processing unit 200 and a storage unit 290. The processing unit 200 is realized by, for example, an arithmetic processing apparatus including a processor. The storage unit 290 is realized including a non-volatile storage medium. The processing unit 200 performs processing by using information stored in the storage unit 290. The processing unit 200 may be realized by an ECU (Electronic Control Unit) including a microcomputer including a CPU, ROM, RAM, I/O, a bus, and the like.

The processing unit 200 includes a calculating unit 210, a setting unit 220, a detecting unit 230, and an assistance controlling unit 240.

The receiving unit 251 receives information indicating a position of the preceding vehicle 21 which is traveling ahead of the vehicle 20 in a running direction. For example, the receiving unit 251 receives the traveling information which is continuously transmitted from the assistance apparatus 41 included in the preceding vehicle 21.

The setting unit 220 sets a reference point to provide the traveling assistance for the vehicle 20 based on the position of the preceding vehicle 21 when the preceding vehicle 21 is determined to be hazardous for the vehicle 20 to travel.

The assistance controlling unit 240 provides the traveling assistance based on the reference point. For example, the calculating unit 210 calculates a distance and an orientation from the vehicle 20 to the reference point based on the reference point and the current position of the vehicle 20. The detecting unit 230 detects the reference point within a range of detection which is set within a predetermined range from the current position of the vehicle 20. The assistance controlling unit 240 provides the traveling assistance when the reference point is detected within the range of detection.

Specifically, the assistance controlling unit 240 notifies an occupant of the vehicle 20 that a hazardous point exists through the HMI function included in the warning apparatus 270. Specifically, the assistance controlling unit 240 notifies an occupant of the vehicle 20 of information indicating a distance from the current position of the vehicle 20 to the reference point through the HMI function included in the warning apparatus 270. The assistance controlling unit 240 may assist driving of the vehicle 20 itself. The assistance controlling unit 240 may assist control of a traveling speed of the vehicle 20. The assistance controlling unit 240 may assist steering of the vehicle 20.

The setting unit 220 updates the reference point while predetermined conditions for determining that the preceding vehicle 21 is hazardous are satisfied after the preceding vehicle 21 is determined to be hazardous. Specifically, the setting unit 220 updates the reference point while the predetermined conditions are satisfied after the preceding vehicle 21 is determined to be hazardous for the vehicle 20 to travel, and stops updating the reference point when the predetermined conditions are no longer satisfied. More specifically, the setting unit 220 updates the reference point while the predetermined conditions are satisfied after the preceding vehicle 21 is determined to be hazardous for the vehicle 20 to travel, and stops updating the reference point and fixes the reference point when the predetermined conditions are no longer satisfied. For example, the setting unit 220 updates the reference point while the predetermined conditions are satisfied after the preceding vehicle 21 is determined to be hazardous for the vehicle 20 to travel, and stops updating the reference point and fixes the reference point when the predetermined conditions are no longer satisfied, and the assistance controlling unit 240 provides the traveling assistance, based on the reference point which is fixed, at least until the vehicle 20 passes through the reference point which is fixed. The assistance controlling unit 240 may provide the traveling assistance after the vehicle 20 passes through the reference point which is fixed, until a distance from the reference point which is fixed to the current position of the vehicle 20 reaches a predetermined distance. The "predetermined distance" may be decided based on a positioning error of the GNSS receiver 25.

The predetermined conditions include conditions regarding at least one of the speed or acceleration of the preceding vehicle 21. The predetermined conditions may include a condition that a magnitude of the acceleration of the preceding vehicle 21 is less than or equal to a predetermined acceleration value.

The predetermined conditions may include a condition that the speed of the preceding vehicle 21 is less than or equal to a predetermined first speed value. The setting unit 220 may determine that the preceding vehicle 21 is hazardous for the vehicle 20 to travel when the speed of the preceding vehicle 21 falls below a second speed value which is lower than the first speed value.

The predetermined conditions may include a condition that the speed of the preceding vehicle 21 is not constant. As a result, the assistance controlling unit 240 can perform traveling control by fixing the point at which the speed of the preceding vehicle 21 becomes substantially constant as the reference point, when the speed of the preceding vehicle 21 becomes substantially constant after the preceding vehicle 21 rapidly decelerated.

The transmitting unit 252 transmits the traveling information to an outside of the vehicle 20. For example, the transmitting unit 252 periodically transmits the traveling information including identification information, current position, current acceleration/deceleration, and current speed of its vehicle to the outside of the vehicle 20.

Figure 5:
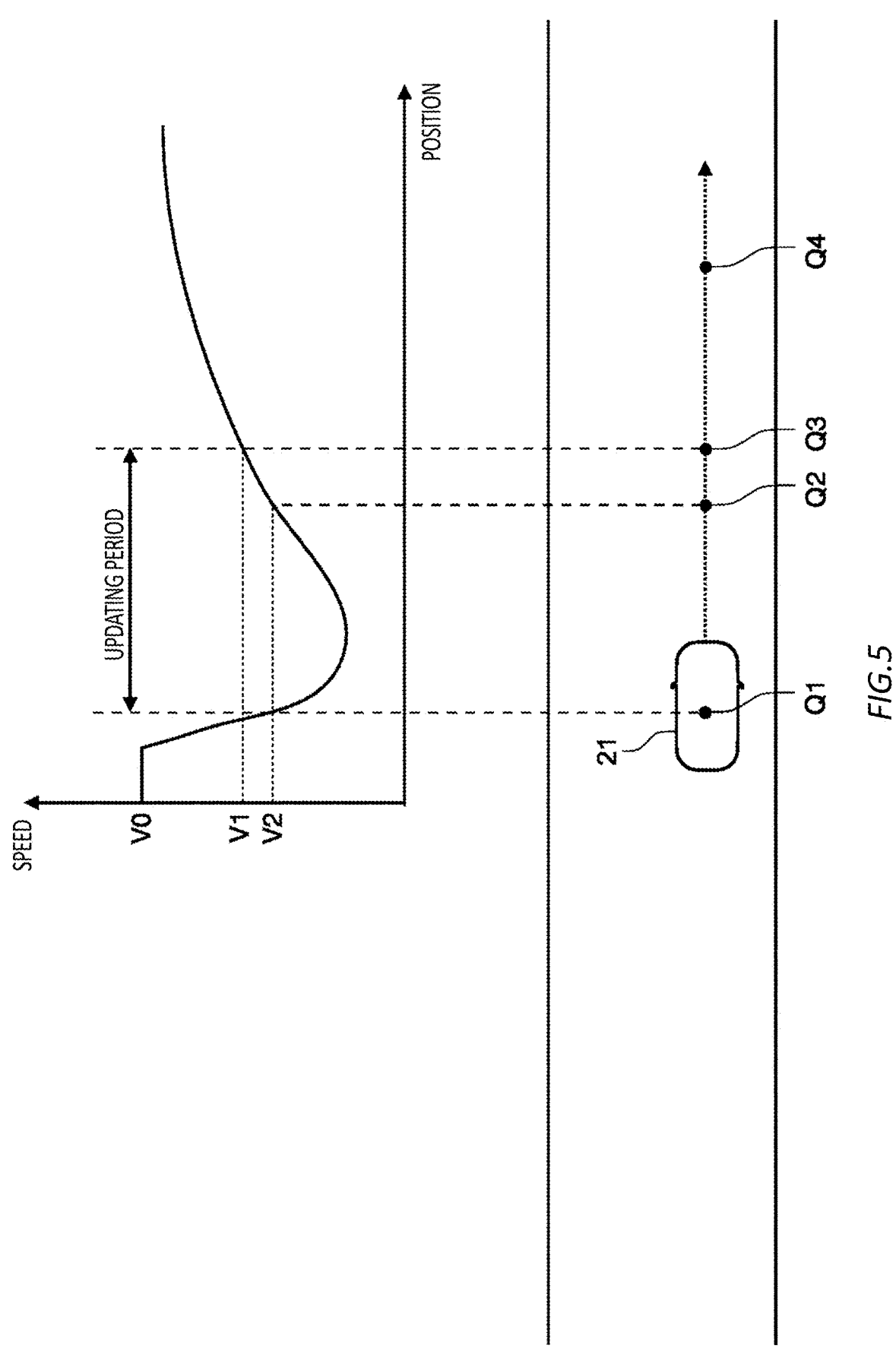
FIG. 5 shows one example of a period during which a setting unit 220 updates a reference point.

FIG. 5 shows one example of a period during which setting unit 220 updates the reference point. When the speed of the preceding vehicle 21 included in the traveling information reaches a speed value V2, which is lower by a predetermined value than a speed value V0 reached before the preceding vehicle 21 rapidly decelerates, the setting unit 220 sets the point of the preceding vehicle 21 when the speed of the preceding vehicle 21 becomes less than or equal to the speed value V2 as the reference point. In the example in FIG. 5, the setting unit 220 sets the point Q1 as the reference point.

Subsequently, the setting unit 220 updates the reference point with the current position of the preceding vehicle 21, and the assistance controlling unit 240 provides the traveling assistance based on the updated reference point until the preceding vehicle 21 reaches a speed value V1. V1 may be set to a value faster than V2.

That is, in the example shown in FIG. 5, the setting unit 220 continues updating the reference point even when the preceding vehicle 21 starts accelerating after it decelerated and the speed of the preceding vehicle 21 reaches V2, and stops updating the reference point and fixes the reference point at the point Q3 when the speed of the preceding vehicle 21 reaches V1, which is faster than V2.

As a result, it can be determined that a substantial acceleration has started in the preceding vehicle 21 when the speed of the preceding vehicle 21 becomes definitely faster than the speed V2 of the preceding vehicle 21 when the reference point was initially set, and updating of the reference point can be stopped. Therefore, when the situation is such that the risk of the vehicle 20 rapidly approaching the preceding vehicle 21 becomes low, the updating of the reference point can be stopped and the reference point can be fixed at the point Q3. The preceding vehicle 21 can be expected to have reached a sufficient speed when the vehicle 20 reaches the reference point Q3. Therefore, even if the assistance controlling unit 240 terminates providing the traveling assistance when the vehicle 20 reaches the reference point Q3, the risk of the vehicle 20 rapidly approaching the preceding vehicle 21 can be said to be substantially low. Accordingly, the reference point for the traveling assistance can be properly updated in accordance with traveling of the preceding vehicle 21, while ensuring that a period for providing the traveling assistance does not become unnecessarily long.

Figure 6:
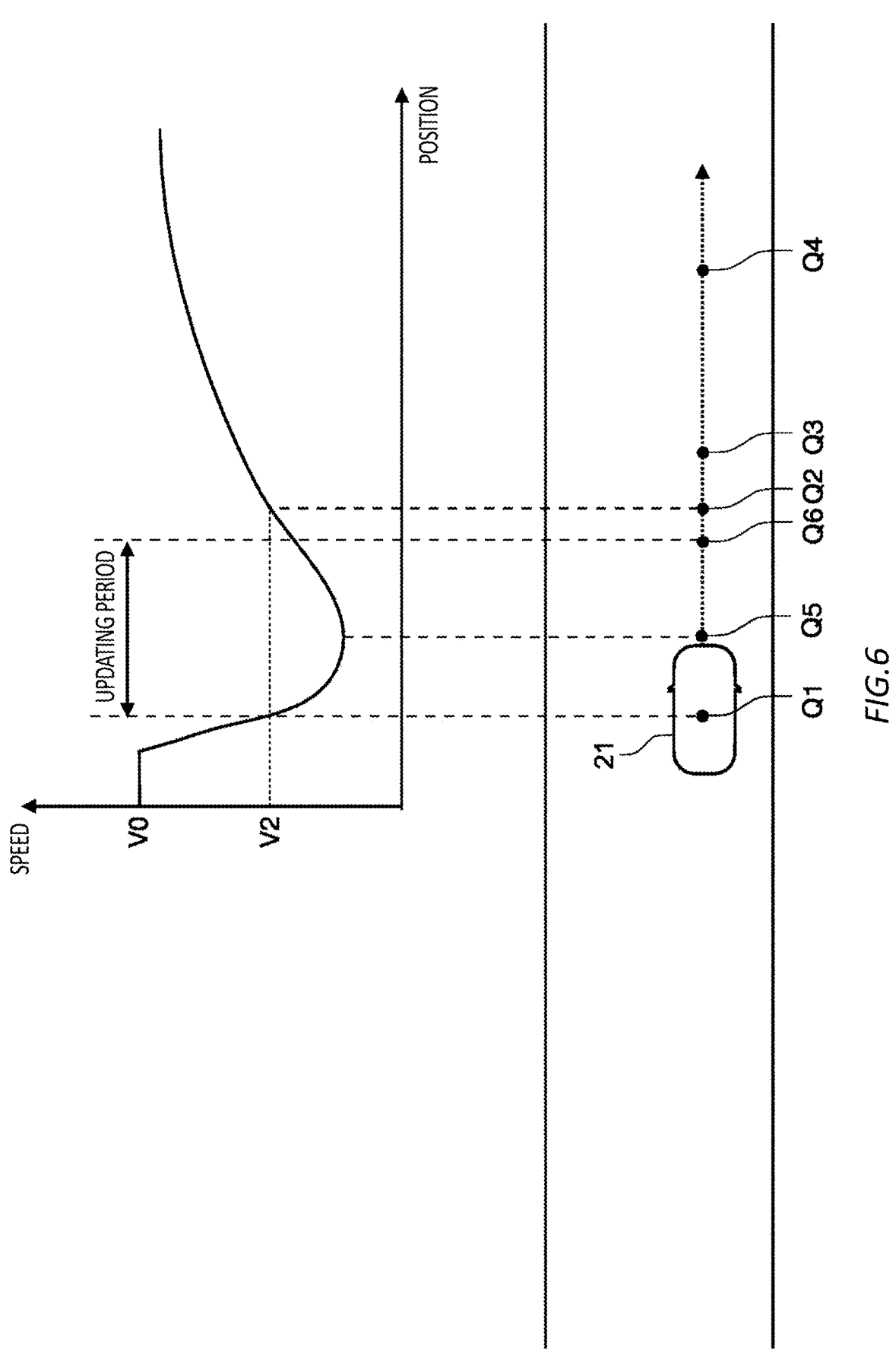
FIG. 6 shows another example of a period during which the setting unit 220 updates the reference point.

FIG. 6 shows another example of a period during which the setting unit 220 updates the reference point. Similar to the example in FIG. 5, the setting unit 220 sets the point Q1 of the preceding vehicle 21 when the speed of the preceding vehicle 21 becomes less than or equal to V2 as a first reference point.

Subsequently, the speed of the preceding vehicle 21 becomes a minimum value at a point Q5, and the acceleration of the preceding vehicle 21 starts at the point Q5. When the distance travelled during the period of continuous acceleration by the preceding vehicle 21 reaches a predetermined distance, the setting unit 220 terminates updating the reference point and fixes the reference point at a point Q6, which is a predetermined distance ahead of the point Q5. That is, the setting unit 220 updates the reference point with the current position of the preceding vehicle 21 while the preceding vehicle 21 is traveling in a section from the point Q1 to the point Q6, and the assistance controlling unit 240 provides the traveling assistance based on an updated reference point. The "predetermined distance" to terminate updating the reference point may be set, for example, based on the speed of the preceding vehicle 21 when it starts accelerating. In this manner, the setting unit 220 updates the reference point when at least a condition that a magnitude of the acceleration of the preceding vehicle 21 is less than or equal to the predetermined acceleration value is satisfied, and stops updating the reference point when the period during which the magnitude of the acceleration of the preceding vehicle 21 exceeds the predetermined acceleration value exceeds a predetermined length, and fixes the reference point.

As a result, the updating of the reference point can be stopped when the acceleration of the preceding vehicle 21 continues over a predetermined period of time. If the acceleration of the preceding vehicle 21 continues over the predetermined period of time, it can be determined that the preceding vehicle 21 is being accelerated intentionally. Accordingly, the preceding vehicle 21 can be expected to have accelerated to a sufficient speed when the vehicle 20 reaches the reference point Q6. Therefore, even if the assistance controlling unit 240 terminates providing the traveling assistance when the vehicle 20 reaches the reference point Q6, the risk of the vehicle 20 rapidly approaching the preceding vehicle 21 can be said to be substantially low. Accordingly, the reference point for the traveling assistance can be properly updated in accordance with the traveling of the preceding vehicle 21, while ensuring that the period for providing the traveling assistance does not become unnecessarily long.

Figure 7:
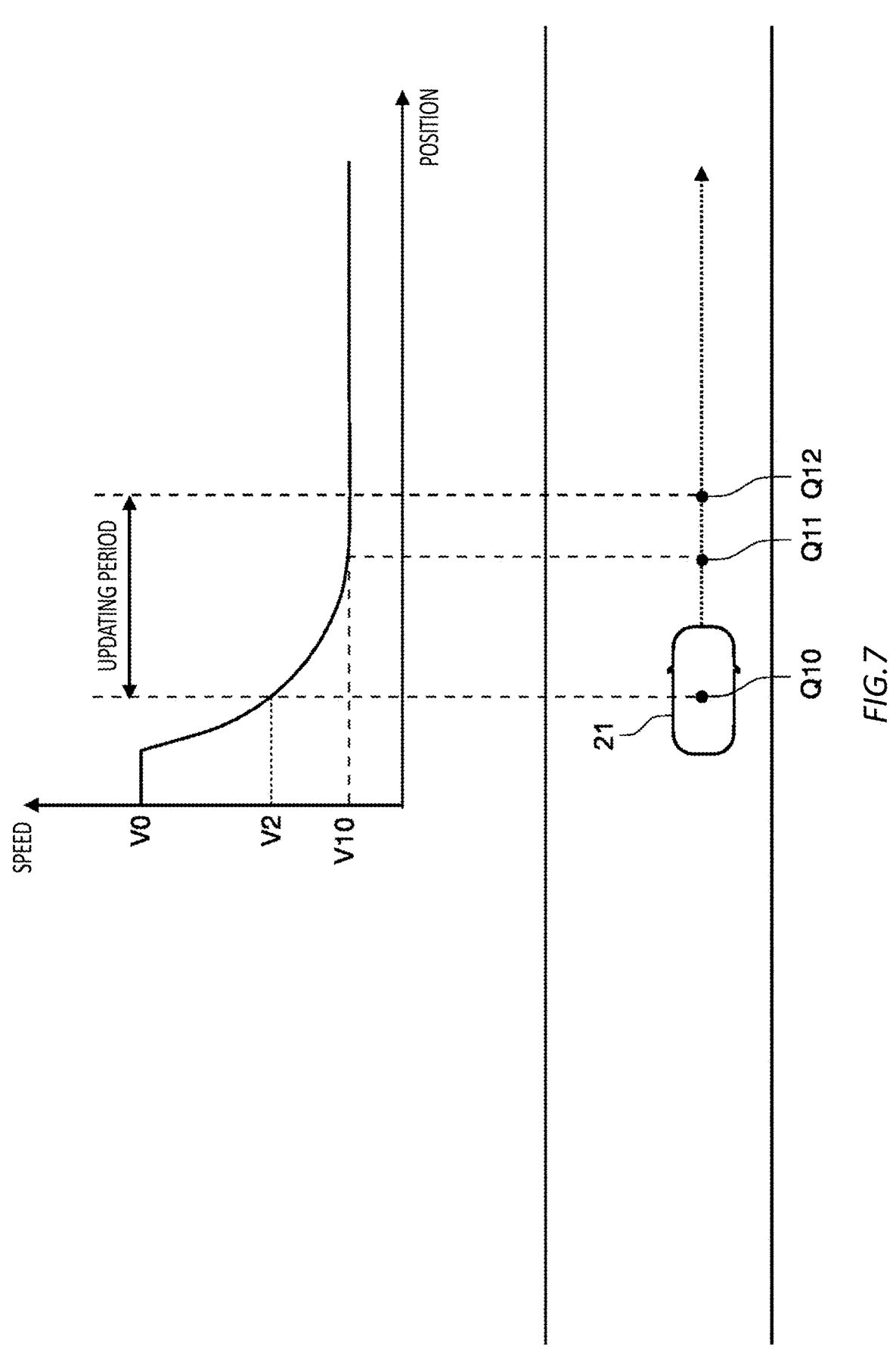
FIG. 7 shows another example of a period during which the setting unit 220 updates the reference point.

FIG. 7 shows another example of a period during which the setting unit 220 updates the reference point. Similar to the example in FIG. 5, the setting unit 220 sets the point Q10 of the preceding vehicle 21 when the speed of the preceding vehicle 21 becomes less than or equal to V2 as a first reference point.

Subsequently, the speed of the preceding vehicle 21 is reduced to V10 at a point Q11, and the speed of the preceding vehicle 21 becomes substantially constant from the point Q11. When the distance travelled by the preceding vehicle 21 after the speed of the preceding vehicle 21 becomes substantially constant reaches the predetermined distance, the setting unit 220 terminates updating the reference point and fixes the reference point at a point Q12, which is a predetermined distance ahead of the point Q11.

That is, the setting unit 220 updates the reference point with the current position of the preceding vehicle 21 while the preceding vehicle 21 is traveling in a section from the point Q10 to the point Q12, and the assistance controlling unit 240 provides the traveling assistance based on an updated reference point. The "predetermined distance" to terminate updating the reference point may be set, for example, based on the substantially constant speed of the preceding vehicle 21. In this manner, the setting unit 220 updates the reference point when at least a condition that the speed of the preceding vehicle 21 is not substantially constant is satisfied, and stops updating the reference point and fixes the reference point when the magnitude of the acceleration of the preceding vehicle 21 becomes substantially constant.

As a result, the updating of the reference point can be stopped when the speed of the preceding vehicle 21 remains constant over a predetermined period of time. When the speed of the preceding vehicle 21 remains constant over the predetermined period of time, it can be determined that the traveling of the preceding vehicle 21 is being continued intentionally. Accordingly, the preceding vehicle 21 can be expected to continue traveling even when the vehicle 20 reaches the reference point Q12. Therefore, even if the assistance controlling unit 240 terminates providing the traveling assistance when the vehicle 20 reaches the reference point Q12, the risk of the vehicle 20 rapidly approaching the preceding vehicle 21 can be expected to be low. Accordingly, the reference point for the traveling assistance can be properly updated in accordance with the traveling of the preceding vehicle 21, while ensuring that the period for providing the traveling assistance does not become unnecessarily long.

Figure 8:
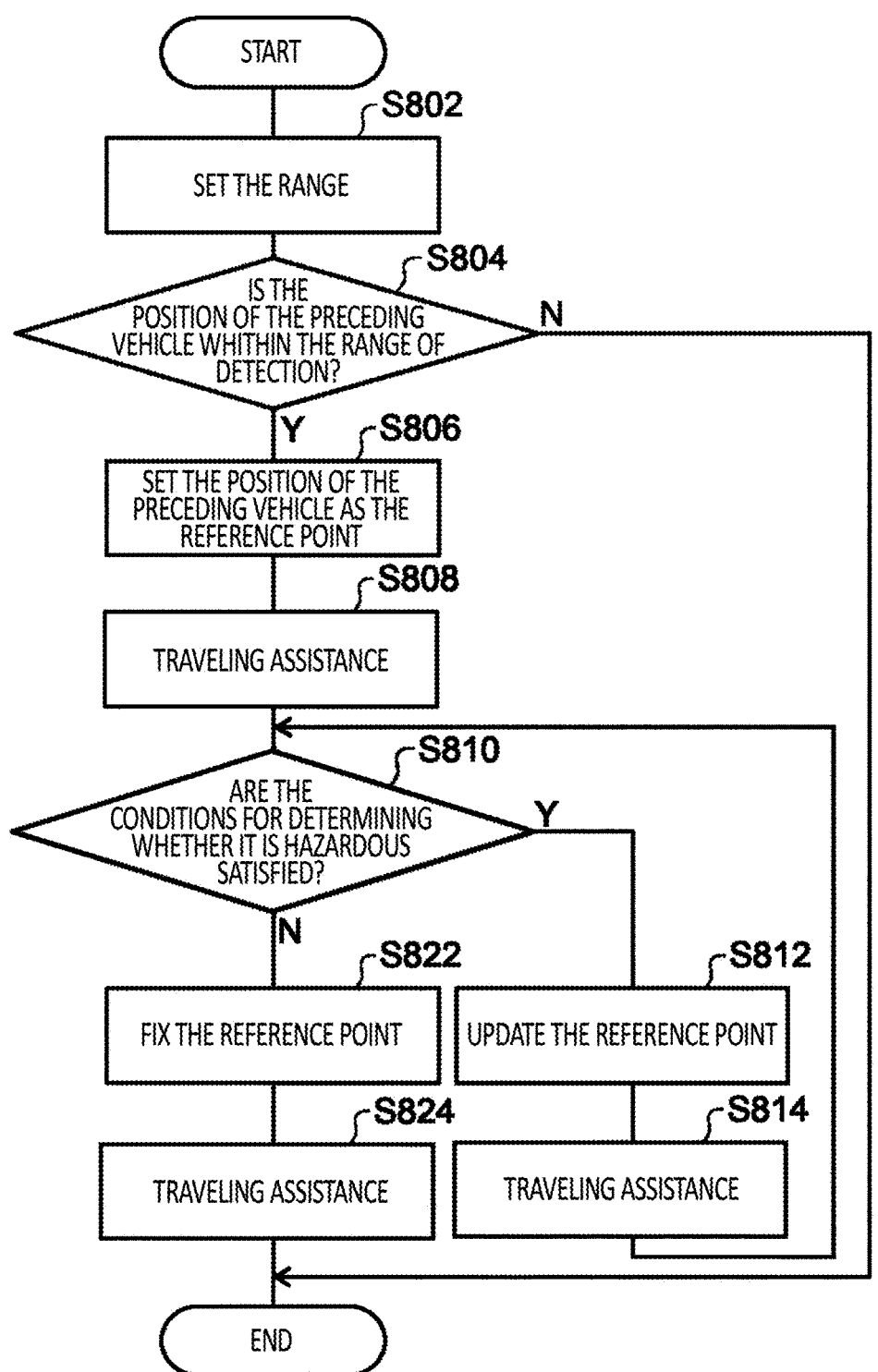
FIG. 8 shows one example of a flowchart regarding an assistance method performed by the assistance apparatus 40.

FIG. 8 shows one example of a flowchart regarding an assistance method performed by the assistance apparatus 40. Processing in the present flowchart is initiated when the assistance apparatus 40 determines that the preceding vehicle 21 has rapidly decelerated based on the traveling information transmitted from the assistance apparatus 41.

At S802, the detecting unit 230 sets the range of detection 100 according to the speed of the vehicle 20. The range of detection 100 is set to be longer along the traveling direction of the vehicle 20 as the speed of the vehicle 20 is faster.

At S804, the detecting unit 230 determines whether the position of the preceding vehicle 21 indicated in position information included in rapid deceleration information is detected within the range of detection 100. For example, the detecting unit 230 determines whether the position of the preceding vehicle 21 is detected within the range of detection 100 when the speed of the preceding vehicle 21 falls below a predetermined second speed value. The detecting unit 230 determines whether the position of the preceding vehicle 21 indicated in the position information included in the rapid deceleration information is detected within the range of detection 100, based on a distance and an orientation to the reference point calculated by the calculating unit 210 and the range of detection 100.

At S804, the processing in the present flowchart is terminated if the position of the preceding vehicle 21 is not detected within the range of detection 100. If the position of the preceding vehicle 21 is detected within the range of detection 100, the setting unit 220 sets the position of the preceding vehicle 21 as the reference point at S806. At S808, the assistance controlling unit 240 provides the traveling assistance based on the reference point.

At S810, the setting unit 220 determines whether the predetermined conditions for determining that the preceding vehicle 21 is hazardous are satisfied. As discussed above, the predetermined conditions may include conditions that the speed of the preceding vehicle 21 is less than or equal to the predetermined speed value V1, that the magnitude of the acceleration of the preceding vehicle 21 is less than or equal to the predetermined acceleration value, that the speed of the preceding vehicle 21 is not constant, and the like. The speed value V1 may be the current speed of the vehicle 20.

If the predetermined conditions for determining that the preceding vehicle 21 is hazardous are determined to be satisfied at S810, the setting unit 220 updates the reference point with the current position of the preceding vehicle 21 at S812, provides the traveling assistance based on the reference point at S814, and shift the processing to S810. The setting unit 220 repeats the processing in S810 each time it receives new rapid deceleration information from the preceding vehicle 21.

If the predetermined conditions for determining that the preceding vehicle 21 is hazardous are determined to be unsatisfied at S810, the setting unit 220 stops updating the reference point with the current position of the preceding vehicle 21 and fixes the reference point at S822. The assistance controlling unit 240 then provides the traveling assistance, based on the reference point which is fixed, at S824. The assistance controlling unit 240 continues providing the traveling assistance, based on the reference point which is fixed, until the current position of the vehicle 20 reaches the reference point which is fixed, and terminates the processing in the present flowchart when the current position of the vehicle 20 reaches the reference point which is fixed.

According to the assistance apparatus 40 described above, the reference point can be updated and the traveling control can be performed based on the updated reference point if the preceding vehicle 21 is determined to be hazardous for the vehicle 20 to travel based on traveling states of the preceding vehicle 21 after the preceding vehicle 21 rapidly decelerated. Further, the updating of the reference point can be stopped when the preceding vehicle 21 is no longer determined to be hazardous for the vehicle 20 to travel. As a result, the reference point for the traveling assistance can be properly updated in accordance with the traveling of the preceding vehicle 21, while ensuring that the period for providing the traveling assistance does not become unnecessarily long.

In the present embodiment, it is assumed that the rapid deceleration information is transmitted and received through vehicle-to-vehicle communication. However, a configuration may be adopted in which a server retaining the rapid deceleration information is further included. For example, upon receiving the rapid deceleration information transmitted from each vehicle, the server may retain the rapid deceleration information for a predetermined period of time. The server may transmit, to a vehicle traveling toward a point indicated in the rapid deceleration information, the retained rapid deceleration information. A vehicle with communication obstacles between itself and the preceding vehicle which transmits the rapid deceleration information, or a vehicle traveling at a position away from the preceding vehicle may be unable to receive the rapid deceleration information through the vehicle-to-vehicle communication, but by providing the server retaining the rapid deceleration information, the rapid deceleration information can be more reliably provided to the vehicle.

It should be noted that the vehicle 20 is a vehicle as one example of transportation equipment. The vehicle may be an automobile such as an automobile including an internal combustion engine, an electric automobile, or a fuel-cell vehicle (FCV). The automobile includes a bus, a truck, a two-wheeled vehicle, or the like. The vehicle may be a saddled vehicle and the like or may be a motorcycle. The transportation equipment includes, in addition to a vehicle, equipment such as an aircraft including as an unmanned aircraft, and a ship. The transportation equipment may be any equipment for transporting humans or goods. The transportation equipment is one example of a moving body. The moving body is not limited to transportation equipment, and may be any movable equipment.

Figure 9:
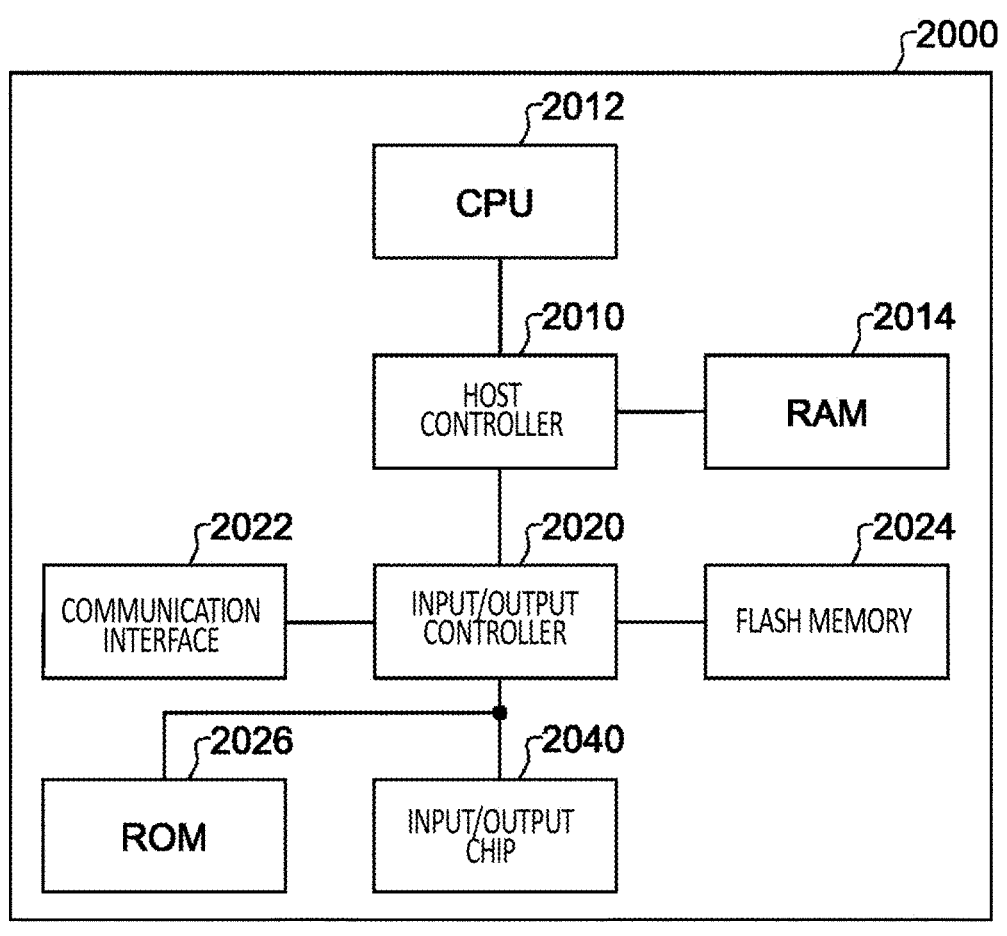
FIG. 9 shows an example of a computer 2000.

FIG. 9 shows an example of a computer 2000 in which a plurality of embodiments of the present invention can be entirely or partially embodied. Programs installed in the computer 2000 can cause the computer 2000 to: function as a system according to the embodiments or each unit of the system or an apparatus such as the assistance apparatus 40 or each unit of the apparatus; execute operations associated with the system or each unit of the system or the apparatus or each unit of the apparatus; and/or execute a process according to the embodiments or steps of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 upon activation, and/or a program which depends on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer readable storage medium such as a CD-ROM, a DVD-ROM, or a memory card. The RAM 2014, the ROM 2026, or the flash memory 2024 is an example of the computer readable storage medium. The program is installed in the flash memory 2024, the RAM 2014, or the ROM 2026, and executed by the CPU 2012. Information processing written in these programs is read by the computer 2000, and provides cooperation between the programs and the various types of hardware resources described above. An apparatus or a method may be actualized by executing operations or processing of information according to a use of the computer 2000.

For example, when a communication is executed between the computer 2000 and an external device, the CPU 2012 may execute a communication program loaded on the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 and the like to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information retrieval/replacement, or the like described herein and specified by instruction sequences of the programs, and write back a result into the RAM 2014. In addition, the CPU 2012 may retrieve information in a file, a database, or the like in the recording medium. For example, when multiple entries each having an attribute value of a first attribute associated with an attribute value of a second attribute, is stored in the recording medium, the CPU 2012 may retrieve an entry having a designated attribute value of the first attribute that matches a condition from these multiple entries, and read the attribute value of the second attribute stored in this entry, thereby obtaining the attribute value of the second attribute associated with the first attribute that satisfies a predetermined condition.

The program or software module described above may be stored on the computer 2000 or in a computer readable storage medium near the computer 2000. A recording medium such as a hard disk or a RAM provided in a server system connected to a dedicated communication network or the Internet can be used as the computer readable storage medium. A program stored in the computer readable storage medium may be provided to the computer 2000 via a network.

The programs installed onto the computer 2000 for causing the computer 2000 to function as the assistance apparatus 40 may act on the CPU 2012 or the like to cause the computer 2000 to function as each unit of the assistance apparatus 40 individually. The information processing written in these programs are read by the computer 2000 to cause the computer to function as each unit of the assistance apparatus 40, which is specific means realized by the cooperation of software and the various kinds of hardware resources discussed above. These specific means are then used to realize computation or processing of information according to the intended use of the computer 2000 in the present embodiment, thereby constructing a specific assistance apparatus 40 according to the intended use.

Various embodiments have been described with reference to the block diagrams and the like. In the block diagrams, each block may represent (1) a stage of a process in which an operation is executed, or (2) each unit of the apparatus having a role in executing the operation. A specific step and each unit may be implemented by a dedicated circuit, a programmable circuit supplied with computer readable instructions stored on a computer readable storage medium, and/or a processor supplied with computer readable instructions stored on a computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element or the like such as a flip-flop, a register, a field programmable gate array (FPGA), a programmable logic array (PLA), or the like.

The computer readable storage medium may include any tangible device capable of storing instructions to be executed by an appropriate device. Thereby, the computer readable storage medium having instructions stored therein forms at least a part of a product including instructions which can be executed to provide means for executing processing procedures or operations specified in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, or the like, and a conventional procedural programming language such as a "C" programming language or a similar programming language.

Computer readable instructions may be provided to a processor of a general purpose computer, a special purpose computer, or another programmable data processing apparatus, or to programmable circuit, locally or via a local area network (LAN), wide area network (WAN) such as the Internet or the like, and a computer readable instruction may be executed to provide means for executing operations specified in the described processing procedures or block diagrams. Examples of the processor include a computer processor, a processing unit, a microprocessor, a digital signal processor, a controller, a microcontroller, and the like.

While the present invention has been described by way of the embodiments above, the technical scope of the present invention is not limited to the scope of the above-described embodiments. It is apparent to persons skilled in the art that various alterations or improvements can be made to the above-described embodiments. It is also apparent from description of the claims that the embodiments to which such alterations or improvements are made can be included in the technical scope of the present invention.

It should be noted that an order of execution of operations, procedures, steps, stages, and the like of each process performed by an apparatus, system, program, and method shown in the claims, specification, and diagrams can be realized in any order as long as the order is not indicated by "prior to," "before," or the like and as long as the output from a previous process is not used in a later process. Even if the operation flow is described using phrases such as "first" or "next" for the sake of convenience in the claims, specification, or drawings, it does not mean that the process must be performed in this order.

EXPLANATION OF REFERENCES

20: vehicle
21: vehicle
29: sensor
25: GNSS receiver
26: vehicle speed sensor
40: assistance apparatus
41: assistance apparatus
100: range of detection
200: processing unit
210: calculating unit
220: setting unit
230: detecting unit
240: assistance controlling unit
250: communication apparatus
251: receiving unit
252: transmitting unit
270: warning apparatus
290: storage unit
2000: computer
2010: host controller
2012: CPU
2014: RAM
2020: input/output controller;
2022: communication interface
2024: flash memory
2026: ROM
2040: input/output chip.

What is claimed is:

1. An assistance apparatus provided in a first vehicle, the assistance apparatus comprising at least one processor, wherein the at least one processor causes a communication apparatus to receive information indicating a position of a second vehicle which is traveling ahead of the first vehicle in a running direction, the at least one processor sets a reference point to the position of the second vehicle at a time that the second vehicle is determined to be hazardous for the first vehicle to travel, the reference point being used for providing traveling assistance for the first vehicle, the at least one processor provides the traveling assistance with the first vehicle based on the reference point, and the at least one processor updates the reference point, while predetermined conditions for determining that the second vehicle is hazardous are satisfied after the second vehicle is determined to be hazardous, by setting a latest position of the second vehicle to be the reference point.

2. The assistance apparatus according to claim 1, wherein the at least one processor updates the reference point while the predetermined conditions are satisfied after the second vehicle is determined to be hazardous for the first vehicle to travel, and stops updating the reference point when the predetermined conditions are no longer satisfied.

3. The assistance apparatus according to claim 2, wherein the at least one processor updates the reference point while the predetermined conditions are satisfied after the second vehicle is determined to be hazardous for the first vehicle to travel, and stops updating the reference point and fixes the reference point when the predetermined conditions are no longer satisfied.

4. The assistance apparatus according to claim 2, wherein the predetermined conditions include conditions regarding at least one of speed or acceleration of the second vehicle.

5. The assistance apparatus according to claim 2, wherein the predetermined conditions include a condition that a magnitude of acceleration of the second vehicle is less than or equal to a predetermined acceleration value.

6. The assistance apparatus according to claim 2, wherein the predetermined conditions include a condition that speed of the second vehicle is less than or equal to a predetermined first speed value.

7. The assistance apparatus according to claim 6, wherein the at least one processor determines that the second vehicle is hazardous for the first vehicle to travel when the speed of the second vehicle falls below a second speed value which is lower than the first speed value.

8. The assistance apparatus according to claim 2, wherein the predetermined conditions include a condition that speed of the second vehicle is not constant.

9. The assistance apparatus according to claim 1, wherein the at least one processor updates the reference point while the predetermined conditions are satisfied after the second vehicle is determined to be hazardous for the first vehicle to travel, and stops updating the reference point and fixes the reference point when the predetermined conditions are no longer satisfied.

10. The assistance apparatus according to claim 9, wherein the at least one processor updates the reference point while the predetermined conditions are satisfied after the second vehicle is determined to be hazardous for the first vehicle to travel, and stops updating the reference point and fixes the reference point when the predetermined conditions are no longer satisfied; and the at least one processor provides the traveling assistance, based on the reference point which is fixed, at least until the first vehicle passes through the reference point which is fixed.

11. The assistance apparatus according to claim 9, wherein the predetermined conditions include conditions regarding at least one of speed or acceleration of the second vehicle.

12. The assistance apparatus according to claim 1, wherein the predetermined conditions include conditions regarding at least one of speed or acceleration of the second vehicle.

13. The assistance apparatus according to claim 1, wherein the predetermined conditions include a condition that a magnitude of acceleration of the second vehicle is less than or equal to a predetermined acceleration value.

14. The assistance apparatus according to claim 1, wherein the predetermined conditions include a condition that speed of the second vehicle is less than or equal to a predetermined first speed value.

15. The assistance apparatus according to claim 14, wherein the at least one processor determines that the second vehicle is hazardous for the first vehicle to travel when the speed of the second vehicle falls below a second speed value which is lower than the first speed value.

16. The assistance apparatus according to claim 1, wherein the predetermined conditions include a condition that speed of the second vehicle is not constant.

17. The assistance apparatus according to claim 1, wherein the at least one processor calculates a distance and an orientation from the first vehicle to the reference point based on the reference point and a current position of the first vehicle, the at least one processor detects the reference point within a range of detection which is set within a predetermined range from the current position of the first vehicle, and the at least one processor provides the traveling assistance when the reference point is detected within the range of detection.

18. A vehicle comprising the assistance apparatus according to claim 1.

19. An assistance method performed in a first vehicle, the assistance method comprising:

causing a communication apparatus provided in the first vehicle to receive information indicating a position of a second vehicle which is traveling ahead of the first vehicle in a running direction;

setting a reference point to the position of the second vehicle at a time that the second vehicle is determined to be hazardous for the first vehicle to travel, the reference point being used for providing traveling assistance for the first vehicle;

providing the traveling assistance with the first vehicle based on the reference point; and updating the reference point, while predetermined conditions for determining that the second vehicle is hazardous are satisfied after the second vehicle is determined to be hazardous, by setting a latest position of the second vehicle to be the reference point.

20. A non-transitory computer readable storage medium having a program stored therein, the program causes a computer provided in a first vehicle, when executed by the computer, to execute:

causing a communication apparatus provided in the first vehicle to receive information indicating a position of a second vehicle which is traveling ahead of the first vehicle in a running direction;

setting a reference point to the position of the second vehicle at a time that the second vehicle is determined to be hazardous for the first vehicle to travel, the reference point being used for providing traveling assistance for the first vehicle;

providing the traveling assistance with the first vehicle based on the reference point; and updating the reference point, while predetermined conditions for determining that the second vehicle is hazardous are satisfied after the second vehicle is determined to be hazardous, by setting a latest position of the second vehicle to be the reference point.

* * * * *